United States Patent [19]
Decoene et al.

[11] 4,094,132
[45] June 13, 1978

[54] MOWER-CONDITIONER

[75] Inventors: Frans J. G. C. Decoene, Zedelgem, Belgium; Cornelis G. M. Muijs, Vougeot, France; Roger H. Van Eecke, Blankenberge; Marc G. Vansteelant, Zedelgem, both of Belgium

[73] Assignee: Clayson N.V., Zedelgem, Belgium

[21] Appl. No.: 733,631

[22] Filed: Oct. 18, 1976

[30] Foreign Application Priority Data

Oct. 23, 1975 United Kingdom .............. 43506/75

[51] Int. Cl.² .............................................. A01D 49/00
[52] U.S. Cl. ................................ 56/14.4; 56/DIG. 1; 56/192
[58] Field of Search ................... 56/1, DIG. 1, 14.4, 56/192, 13.5

[56] References Cited
U.S. PATENT DOCUMENTS 3,672,136 6/1972 Peacock et al. ...................... 56/14.4
3,803,821 4/1974 Peacock et al. ...................... 56/192

FOREIGN PATENT DOCUMENTS 1,520,474 3/1968 France ............................. 56/DIG. 1
1,520,475 3/1968 France ............................. 56/DIG. 1
1,578,285 7/1969 France ............................. 56/DIG. 1
1,321,594 6/1973 United Kingdom .................. 56/192

Primary Examiner—Russell R. Kinsey
Attorney, Agent, or Firm—John B. Mitchell; Frank A. Seemar; Joseph A. Brown

[57] ABSTRACT

This invention relates to mower conditioners of the type having at least two rotatable cutter units mounted side-by-side and each supporting at least one cutter blade to cut the standing crop by impact, as opposed to shearing. The mower-conditioner comprises a rotary crop conditioning and spreading apparatus extending rearwardly of the mower and having a pair of rotary units disposed rearwardly of each pair of cutter units, with each rotary unit being rotatable about a generally upright axis. One rotary unit of each pair of rotary units is located closer to the mower than the other rotary unit of the pair.

19 Claims, 12 Drawing Figures

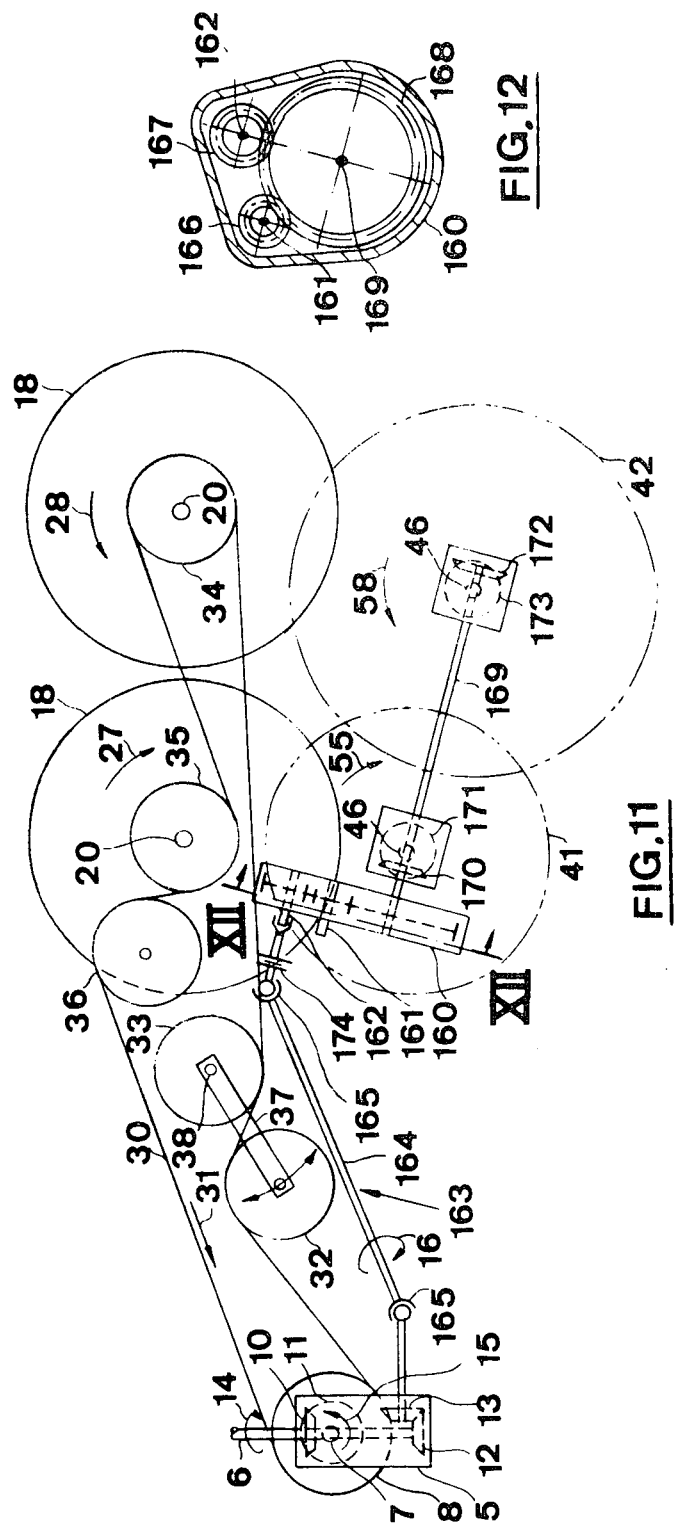

MOWER-CONDITIONER

BACKGROUND OF THE INVENTION

1. Field of the Invention

This invention relates to mower conditioners for agricultural use and more particularly to mower conditioners of the type having at least two rotatable cutter units mounted side-by-side and each supporting at least one cutter blade to cut the standing crop by impact, as opposed to shearing, during forward movement of the mower-conditioner.

The rotatable cutter units may be of the type comprising a disc-like structure supporting at its outer periphery at least one cutter blade and being driven from below by drive means which are arranged inside a housing, the housing extending below the cutter units and in transverse direction over substantially the total width of the machine. However, the rotatable cutter units may also be of the so-called "drum" type comprising top driven drums supporting at their lower ends truncated flanges each of which supports at least one cutter blade at its outer periphery.

The terms "forward," "rearward" and "transverse" used throughout the specification are with respect to the direction of movement of the machine in operation.

DESCRIPTION OF THE PRIOR ART

Some mower-conditioners currently in use have either a disc-type or a drum-type cutter assembly in combination with a pair of transversely extending cooperating conditioner rolls. In operation, the standing crop is cut by means of the cutter units and flung rearwardly into the intake nip between the conditioner rolls. The conditioner rolls are rotated in a manner to receive the cut crop at their forwardly facing intake nip and to pull the crop therebetween while "conditioning" it by which is meant squeezing and cracking the stems so as to facilitate the evaporation of the moisture therefrom and hence speed up the drying cycle. Finally, the conditioner rolls eject the treated crop in a rearward direction depositing it in a window on the ground surface. In general, the operation of a mower conditioner of the above type is satisfactory as far as mowing and conditioning are concerned.

However, the window formed thereby is quite often a rather thick and dense layer of crop, whereby the lowermost portions of the layer, in spite of the preceding conditioning operation, cannot dry quickly. For better and quicker drying, and thus to reap full benefit from the conditioning operation, the mown and conditioned crop should be further treated with a tedder or the like as soon as possible after the conditioning operation, so as to spread the crop in an even, thin and fluffy layer or windrow. Thereby the sun and wind can easily and advantageously influence the drying speed of all of the mown crop. Since haymaking is quite often a "one person" operation, the subsequent treatment of the mown and conditioned crop is normally not started until the entire mowing and conditioning operation has been finished and hence the subsequent treatment is quite often delayed considerably, whereby the benefit of having conditioned the crop is at least partially annulled.

Moreover, it occasionally happens that the transitional movement of the crop from the cutter units to the conditioner rolls is not entirely satisfactory in as far as this movement is sometimes uneven. This ultimately results in the crop passing through the conditioner means in bunches, which again results in poor conditioning. The cause of this is considered to be that of the rolls not being sufficiently aggressive on the crop which is fed thereto.

In another known arrangement, a twin-rotor tedder has been hitched to the rear of a known four-disc rotary mower for spreading the crop immediately after being cut. In this arrangement the tedder extends parallel to the mower means at a considerable distance rearwardly thereof and has substantially the same width as the mower means. The axis of symmetry of both the mower means and the tedder coincide with each other. The tedder comprises a pair of supporting wheels arranged underneath respective rotor units, the latter each comprising four radially-outwardly projecting arms with generally upright tines at their outer ends. The lower ends of the tines, when in their forward position, extend to a location below and rearwardly of the rear edge of the associated mower means. The tedder units are rotated in opposite directions so as to have the tines moving towards each other at their forward ends.

In operation, the two machines are moved over the field, one behind the other. The standing crop is cut by the cutter units of the mower and is discharged thereby in a rearward direction at locations generally above and rearwardly of the areas between respective pairs of mower units. This means that the crop is discharged in two portions positioned generally forwardly of the rotary axis of the respective tedder rotors. This also means that, at the moment the tines contact the crop, the tines are moving in a direction generally transverse to the forward movement of the machine and hence generally perpendicular to the direction of movement of the crop being discharged from the mower cutter units. This, together with the fact that the tines extend in a generally upward direction, i.e. also generally perpendicular to the rearward direction of movement of the cut crop, results to some extent in the cut crop being thrown rearwardly between the tedder units in bunches rather than being evenly spread. The foregoing also results in a rather poor conditioning operation of the tedder, if any at all, as it is difficult for the tines to crack the crop stems when the crop is conveyed in bunches through the tedder means.

Also the relatively large distance between the mower means and the tedder may adversely influence the fluent transition of the crop from one to the other and hence also the spreading action of the tedder is adversely influenced thereby. Moreover, because the equipment is merely two individual machines being towed one behind the other, the relative position of the two machines varies continuously due to ground irregularities. This again may adversely influence the transition of the crop from the mower means to the tedder.

Furthermore, the tines may occasionally touch the ground at the forward end of the tedder whereby soil, stones, etc. may be mixed with the crop, on the one hand, and the tines may be submitted to heavy loads which may cause damage thereto, on the other hand.

Also because of the generally parallel relationship between mower and tedder, normally the mown crop is spread (be it unevenly) over at least the full width of the mower. In other words, no strip of ground is left clear of mown crop for the right hand tractor wheels to run therealong during the next run. Thus, after having spread the crop in a generally fluffy manner, a portion thereof will very soon be compressed again by the tractor wheels during the next run. More importantly, a considerable amount of cut crop is thrown on the still standing crop, which has to be cut during the next run. This is of course undesirable. Moreover, this occasionally may interfere with the proper cutting action of the machine during the next run, and/or may result in crop losses due to double cut.

In still another arrangement, rotary mower means, which are inclined relative to the transverse direction, have been combined with a single-rotor tedder extending horizontally and transversely. The tedder comprises a single transverse and horizontal shaft with a plurality of tines thereon and is arranged to rotate in such a manner as to operate on the cut crop either by a back-kicking action or an up-and-over action. The tedder is positioned at a considerable distance behind the mower means, whereby during operation, mown crop is first discharged onto the ground surface before being treated by the tedder. This has proven to be a considerable disadvantage for several reasons; because the tedder has to lift mown crop from the ground, it may sometimes miss some of the crop and at other times may mix soil, stones, etc. with the crop. Also, a tedder of this type has only a very minor conditioning action, if any at all.

SUMMARY OF THE INVENTION

It is the principle object of the present invention to overcome or to attenuate one or more of the aforementioned disadvantages of mower conditioners.

According to one aspect, the invention provides a mower-conditioner comprising mower means having a plurality of cutter units of the drum type, and rotary crop conditioning and spreading means mounted behind the mower means so as to operate on the cut crop.

Preferably, the cutter drums are arranged in pairs with corresponding pairs of rotary conditioning and spreading units disposed behind respective pairs of cutter drums.

According to another aspect, the present invention provides a mower-conditioner comprising transversely-extending rotary mower means with at least one pair of oppositely-rotated cutter units, and rotary crop conditioning and spreading means extending rearwardly of the mower means and having a pair of rotary units disposed rearwardly of each pair of cutter units, with each rotary unit being rotatable about a generally upright axis and with one rotary unit of each pair being located closer to the mower means than the other rotary unit of the pair.

Preferably the rotary cutter units are of the drum type, each comprising a generally vertical top-driven drum with a truncated flange secured at the bottom edge thereof and supporting cutter blades at the lower edge and outer periphery thereof. The cutter units of each pair are driven in opposite directions so that at their forward ends they move towards each other and sweep the cut crop inwards and backwards between the neighbouring drums of each pair. Crop conveying ribs or the like may be secured to the drum surfaces and also to the flanges for assisting in moving the mown crop rearwardly.

The rotary units of the conditioning and spreading means are each driven in the same direction as the associated cutter unit behind which it is mounted. Each rotary unit preferably comprises a generally upright, although slightly forwardly inclined, shaft having a plurality of conditioning and spreading elements, such as tines secured thereto. The tines extend in a generally radially outwardly direction from the shaft although slightly inclined to, and trailing, a true radius relative to the direction of shaft rotation. The tines may be arranged in one or more layers in planes generally perpendicular to the associated rotor shaft. Preferably the paths of the outer ends of the tines of neighbouring rotary units overlap each other with the rotary units being driven in synchronism.

The left-hand rotary unit, looking from the rear of the machine, of each pair is arranged as close as possible to the rear side of the associated cutter unit so that the rearmost portion of the latter is positioned generally underneath the rotary unit. The right-hand rotary unit of each pair is positioned slightly further rearwardly of the machine compared with the left-hand unit. Nevertheless, the right-hand rotary unit still has the path of the outer ends of the tines in an overlapping relationship with the cutterpath of the associated cutter unit. As a result of this offset relationship of the rotary units of each pair, the plane of symmetry of the conditioning and spreading means is positioned at an angle with the plane of symmetry of the mower means. Thus the centre line of a pair of rotary units subtends an acute angle with the transverse direction of the machine.

In an alternative embodiment of the invention, the right-hand rotary unit of each pair may have a diameter which is slightly larger than the diameter of the left-hand rotary unit.

IN THE DRAWINGS

Mower-conditioners according to the present invention will now be described in greater detail, by way of example, with reference to the accompanying drawings, in which:

FIG. 1 is a schematic top view of one mower conditioner according to the invention, FIG. 2 is an enlarged sectional view taken along the line II—II of FIG. 1 with some portions omitted for clarity, FIG. 3 is a sectional view similar to FIG. 2 taken along the line III—III of FIG. 1, FIG. 4 is a side view with portions broken away and others omitted for clarity and showing an alternative embodiment of a mower conditioner according to the invention, FIG. 5 is a schematic top view, similar to FIG. 1 of still another embodiment of the invention, FIG. 6 is a schematic sectional view taken along the line VI—VI of FIG. 5 with some portions of the machine shown in another characterizing position and other portions omitted for clarity.

FIG. 7 is a diagrammatic illustration of the operation of a prior art machine,

FIG. 8 is a view similar to FIG. 7 illustrating the operation of a machine according to the invention, FIG. 9 is a view taken in the direction IX of FIG. 8, FIG. 10 is a diagrammatic view of the drive means of a further embodiment of the invention, FIG. 11 is a view similar to FIG. 10 of still another embodiment of the invention, and FIG. 12 is a partial sectional view taken along the line XII—XII of FIG. 11.

DETAILED DESCRIPTION OF THE PREFERRED EMBODIMENT

Figure 1:
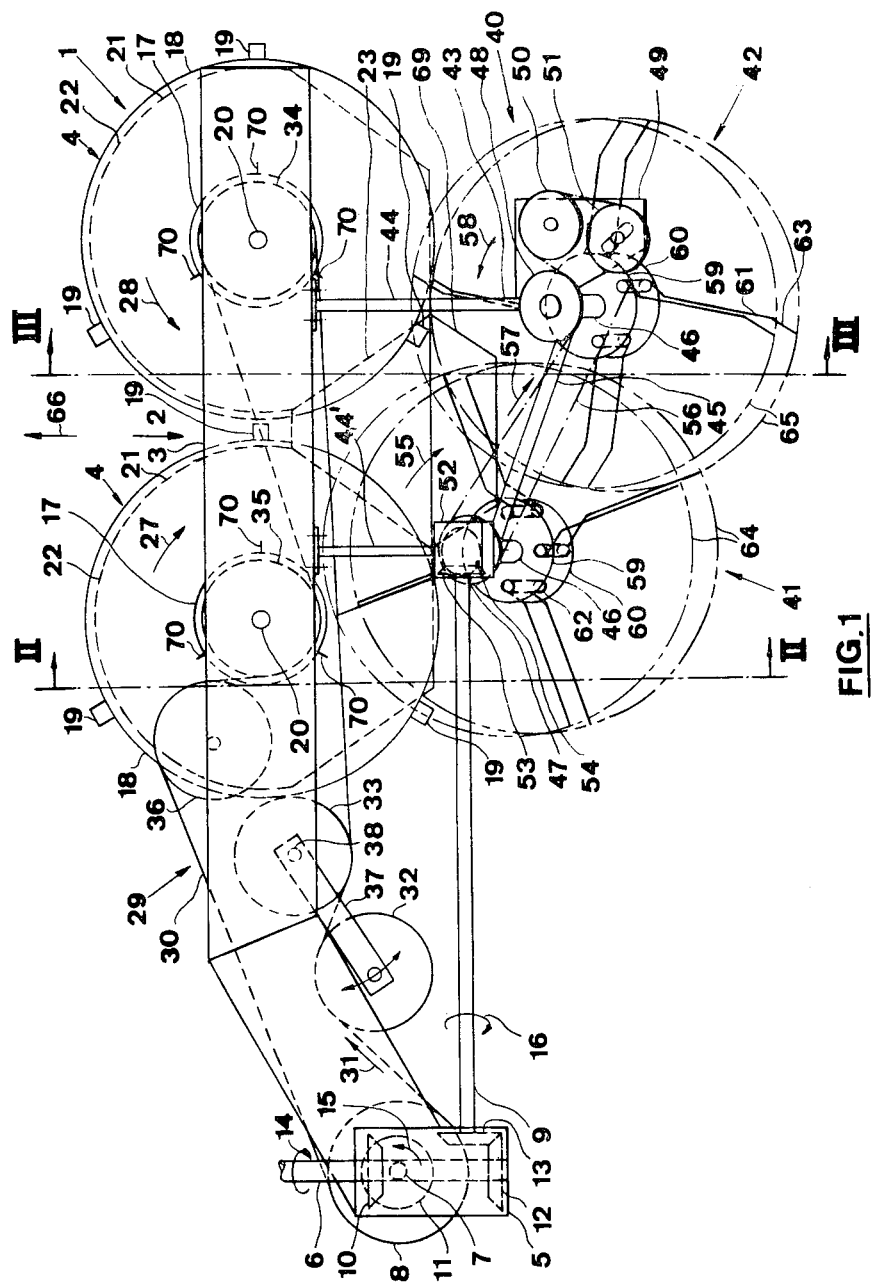
Figure 2:
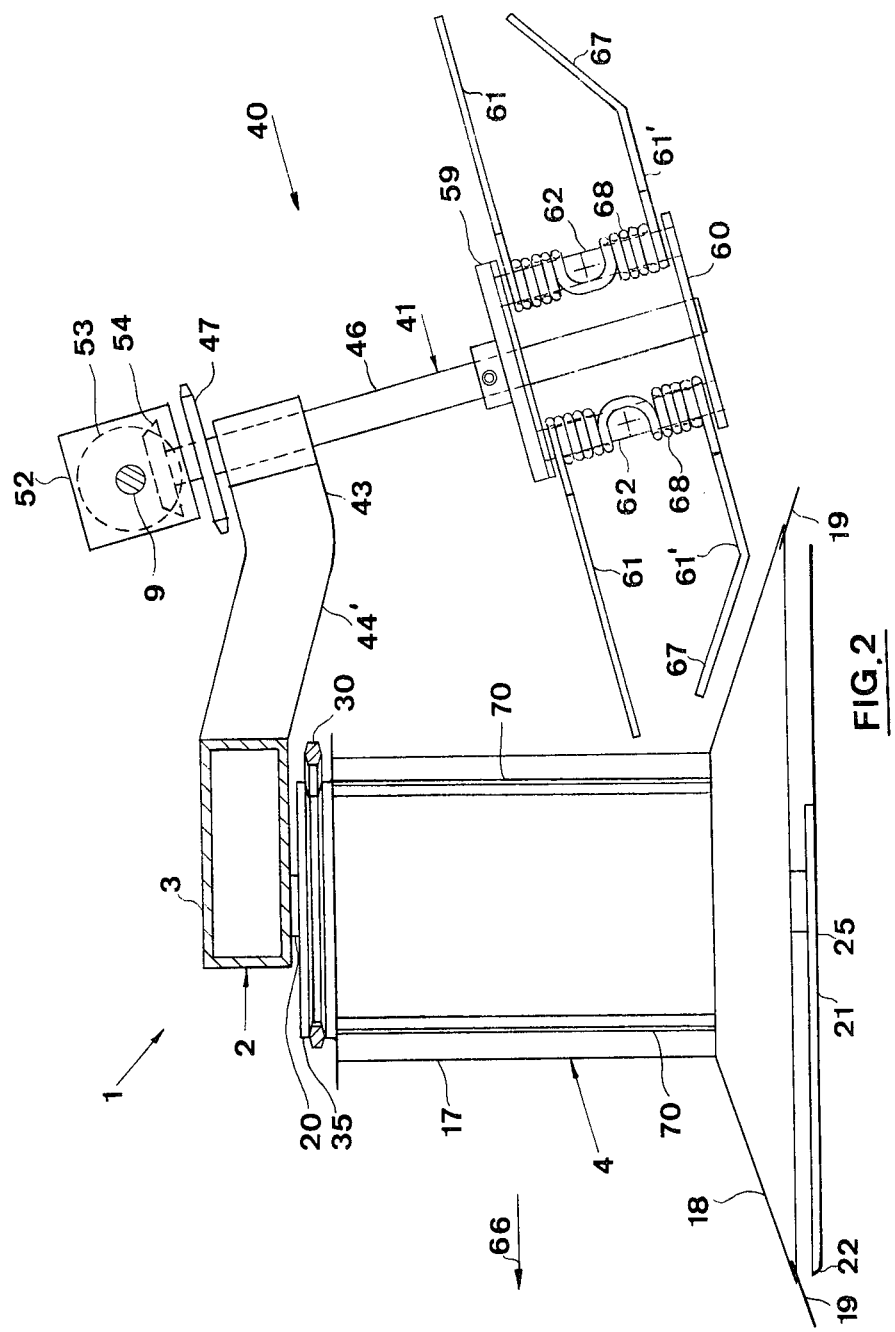
Figure 3:
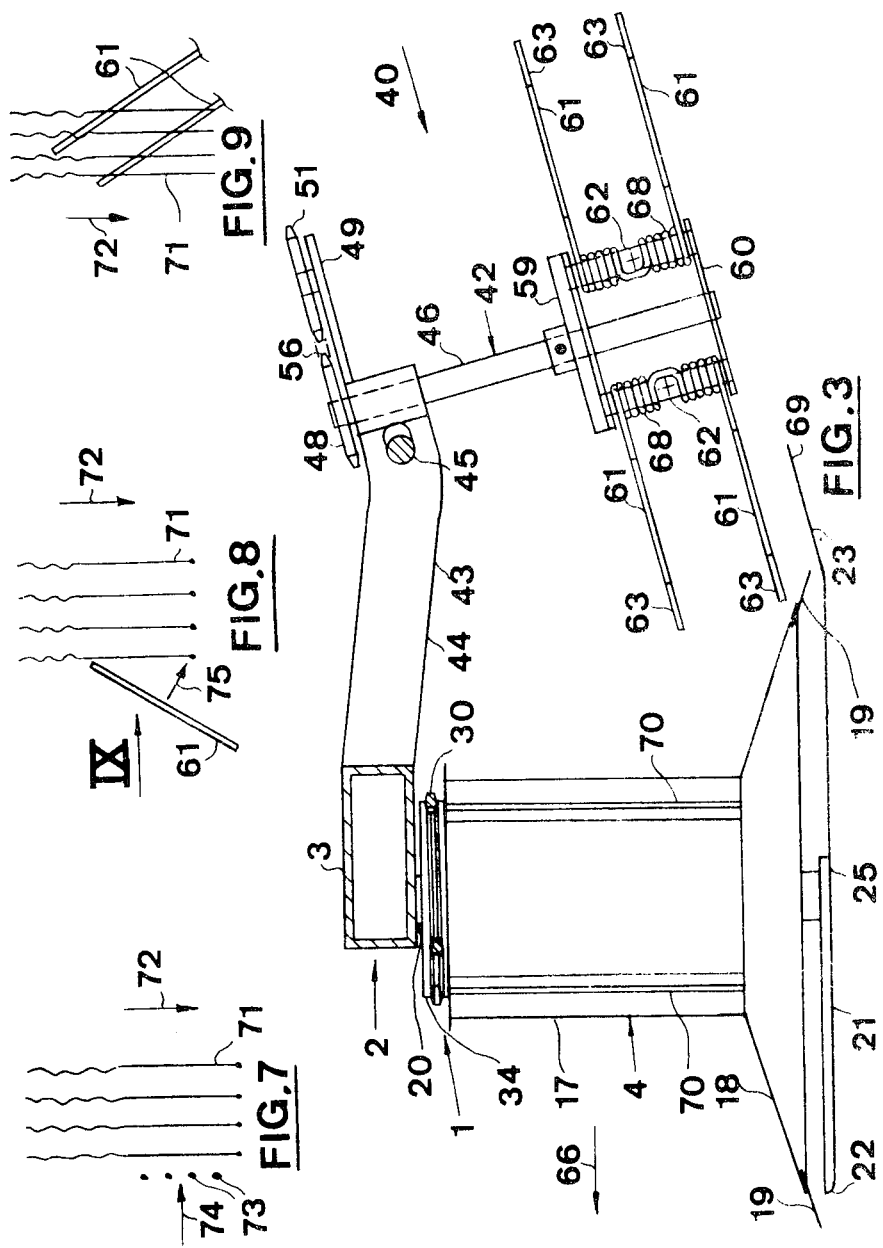

With reference to FIGS. 1 to 3, the mower-conditioner is of the tractor-mounted type, is indicated generally at 1, and comprises a chassis 2 having a generally transversely-extending main and upper beam 3 and a pair of rotary type cutter units 4 depending therefrom. The transversely extending main beam 3 is connected in a manner known per se to the three point-linkage of the tractor (not shown) by means of an appropriate subframe (also not shown). At its extreme left end, as seen in FIG. 1, the upper main beam 3 supports a gearbox 5 having a forwardly-facing input shaft 6 which is adapted to be coupled to the tractor PTO by means of a universal joint (not shown). The gearbox 5 further also comprises a downwardly extending output shaft 7 supporting a pulley 8 as well as a transverse output shaft 9. Motive power is transmitted from the input shaft 6 to the output shafts 7 and 9 via conical gears 10, 11 and 12, 13, respectively. The direction of movement of the input shaft 6 is indicated at 14 and the conical gears 10 to 13 are arranged so as to cause the output shafts 7 and 9 to rotate in the directions 15 and 16, respectively.

The rotary cutter units 4 are of the drum type and each comprise a mower drum 17 having crop conveying members 70 thereon and having at the lower end a truncated mower flange 18 secured thereto. The mower flange supports at the outer periphery a plurality of cutter blades 19. Each rotary mower unit 4 is rotatably supported on downwardly-projecting stationary shaft 20 affixed to the underside of the main beam 3 and which at the other and lower end supports stationary drum-support members 21. Each stationary support member 21 has an upwardly curved forward edge 22 which terminates at the outer periphery of the associated mower flange 18, the support being fully covered thereby. The support members 21 are interconnected by links 23 disposed rearwardly of the rotary axes of the mower units. The support members 21 have generally flat central portions 25 arranged in use to support at least a portion of the total weight of the machine upon the ground.

The rotary cutter units 4 are driven in opposite direction, as shown at 27 and 28, by a belt drive transmission generally indicated at 29 and which extends between the pulley 8 and the cutter units 4. This belt transmission comprises a single belt 30 which, seen in the direction of rotation 31, extends around the pulley 8, forwardly around a first tension pulley 32, rearwardly around a second tension pulley 33, around a pulley 34 which is arranged coaxially with the right-hand cutter unit (as seen in FIG. 1), rearwardly around a pulley 35 which is arranged coaxially with the other cutter unit, and finally, forwardly around a third tension pulley 36. The first tension pulley 32 is rotatably mounted on a spring-loaded pivot arm 37 which is arranged to pivot around a pivot shaft 38 and urged to move in a forward direction by a tension spring (not shown). The position of the second and third tension pulleys 33 and 36 may be made adjustable. However, during normal operation, the rotary axes thereof are fixedly supported on the main beam 3. The cutter paths of the cutter blades 19 are arranged to overlap each other and in order to avoid collision of cutter blades of the adjacent cutter units, the cutter blades of one unit are staggered in height relative to the cutter blades of the other unit, whereby the cutter units do not have to be driven in synchronism.

Rearwardly of the mower means, the mower-conditioner comprises conditioner and spreader means generally indicated at 40 and comprising a pair of rotary conditioner and spreader units 41 and 42. These rotary units 41, 42 are rotatably mounted in a subframe 43 which is fixed to the main upper beam 3 and comprises a pair of forwardly-projecting mounting beams 44 and 44' and a transverse intermediate beam 45. The conditioner and spreader units 41 and 42 comprise generally upwardly-directed but slightly-forwardly inclined rotary shafts 46 which are rotatably mounted in the subframe 43 and support at their top ends drive sprockets 47 and respectively, 48. The forward inclination of the shafts 46 is preferably of the order of 20° relative to the vertical. The subframe 43 further supports at its right-hand side an extension 49 supporting a pair of tensioning and reversing sprockets 50 and 51, respectively. Concentrically with the left-hand shaft 46 and at the top end thereof a gearbox 52 is arranged on the subframe 43. Motive power is supplied from the gearbox 5 to the gearbox 52 via the transverse output shaft 9. Inside the gearbox 52 a pair of conical gears 53 and 54 are arranged to transmit the motive power from the transverse shaft 9 to the shaft 46 of the left-hand rotary unit 41 which is caused to rotate in the direction 55. A chain transmission 56 extending, when seen in the direction of movement 57 thereof, from around the sprocket 47, rearwardly of the sprocket 48 and around the sprockets 50 and 51, is arranged to drive the right-hand rotary unit 42 in the direction 58 and in synchronism with the adjacent rotary unit 41.

Each shaft 46 supports at its lower end a pair of mounting flanges 59 and 60 for supporting conditioning and spreading tines 61. The mounting flanges 59, 60 extend perpendicularly to the shafts 46 and hence are inclined slightly upwardly to the rear by the same angle as the shafts 46 are inclined forwardly. The conditioning and spreading tines 61 are mounted on the flanges 59, 60 via mounting spindles 62 and extend outwardly within planes perpendicular to the longitudinal axes of the shafts 46. Preferably, the tines 61 are positioned in a slightly trailing position relative to radii of the shafts 46 and the mounting spindles 62. The extreme ends 63 of the tines 61 of the right-hand conditioner and spreader unit 42 are bent in rearward direction when seen in the direction of rotation 58.

As best seen in FIG. 1, both conditioning and spreading units 41 and 42 have substantially the same diameter. Also, while the left-hand unit 41 is positioned as close as possible to the rear side of the left hand mower drum 17 and thus substantially covering the rearmost portion of the associated mower flange 18, the right-hand unit 42 is spaced further rearwardly of the associated right-hand mower drum 17. Nevertheless the path 65 of the outer ends of the tines 61 still overlap to some extent the cutter path of the associated cutters 19.

As a result of the offset of one rotary unit relating to the other, the center line or line of symmetry of the units 41 and 42 subtends an acute angle with the transverse direction of the machine. The angle subtended is preferably of the order of 20°. The paths 64, 65 of the extreme ends of the tines of the rotary units 41, 42 also overlap each other to a substantial extent, hence the synchronised drive of these units.

As best seen in FIG. 2, the lower tines 61' of the left-hand rotary unit 41 have an upwardly bent outer end 67, whereby the tines 61 avoid contact with the associated mower flange 18. As seen from FIGS. 2 and 3, the tines 61 are of the spring type and comprise spring coils 68 extending around the mounting spindles 62. The links 23 interconnecting the support members 21 have upwardly bent rear extensions 69 which act as guide surfaces between the cutter means 4, on the one hand, and the conditioner and spreading means 40, on the other hand.

OPERATION OF THE PREFERRED EMBODIMENT

In operation, the machine is driven in the field in the direction 66 and the cutter units 4 and the conditioning and spreading means 40 are driven in the opposite directions 27, 28 and 55, 58, respectively, as described. Standing crop is cut by the cutter blades 19 and is flung in rearward direction through the discharge opening between the drums 17 and above the flanges 18 by the action of the drums and flanges. The drums 17, and more particularly the crop conveying means 70 thereon, help positively to urge the cut crop in the rearward direction. During this rearward movement immediately after being released by the drums 17, the cut crop is intercepted by the conditioning and spreading tines 61-61' of the left hand rotary unit 41, whereby a fluent and continuous transitional movement from the cutter means to the conditioning means is achieved as well as a continuous clearing of the rear side of the cutter means of cut crop. Apart from this immediate interception of the cut crop after being released by the drums 17, the following characteristics of the machine also aid the fluent flow of cut crop from the cutter units to the conditioner and spreader units: the tines 61-61' are particularly aggressive (more so than the known twin-roll conditioner means); when intercepting the cut crop which is moving in a generally rearward direction, the tines 61-61' also have a rearwardly-directed component of movement; due to the slightly upward inclination of the paths 64, 65 of the tines 61-61' at the location where the crop is first contacted thereby, the tines have a so-called "combing" action on the crop.

Furthermore, the upwardly-inclined rear guide surfaces 69 of the links 23 also assist in conveying the cut crop upwardly and towards the conditioning means and prevents any crop from moving therebelow and hence escaping the conditioning action. The tines 61 of the right-hand rotary unit also positively assist in conveying the cut crop rearwardly.

Due to the slight upward inclination of the rearward adjacent sections of the paths 64, 65 of the tines 61-61', and to the slight offset of the right-hand rotary unit 42 relative to the left-hand rotary unit 41, the crop is deflected in upward direction as well as to the left. This aids the conditioning effect of the machine according to the invention.

However, the conditioning effect is attributable in particular to the above mentioned combing action in combination with the relatively high rotary speed of the rotary units which in general, is in the range of 400 to 600 rpm (or 15 to 25 m/sec). This results in a considerable acceleration of the crop and a continuous cracking of the stems thereof, whereby, as explained before, moisture can evaporate more quickly therefrom.

With reference to FIGS. 7 to 9, the operation of the conditioner and spreader means according to the present invention will be further clarified. FIG. 7 schematically illustrates the operation of a machine which is known in the art. The crop is indicated at 71 as moving in the direction 72. The tines 61 extend generally perpendicularly to the layer of crop, whilst at the moment of intercepting said crop, the tines 61 are moving in a direction 74 which equally is directed generally perpendicularly to the direction of movement 72 of the crop. This results in the tines 61 entrailing bunches of crop in a rearward direction. As a result, the crop is either not conditioned at all or is only conditioned to a degree much less than desired.

FIGS. 8 and 9 illustrate the operation of the conditioner means according to the present invention and it will be seen therefrom that the tines 61, when intercepting the crop 71 moving in a rearward direction 72, are moving in a direction 75 which comprises a rearwardly directed component. Furthermore, when seen in side view along arrow IX, the tines 61 also define an acute angle with the layer of crop 71. Both of these aspects result in the aforementioned desirable "combing" action.

After having been submitted to the conditioning action, the crop is discharged in a slightly upward direction and slightly to the left of the operative direction of movement of the machine, whereafter the conditioned crop is deposited on the ground in a fluffy and very even and widespread pattern or windrow, ready for immediate fast drying. This ideal pattern is obtained by the above described arrangement of the conditioner and spreader units 41, 42 and more particularly by the "combing" action of the tines 61-61' thereof as well as by the slightly upward inclination of the neighbouring portions of the working paths 64, 65 of the tines 61-61' and by the slightly rearward offset of the right-hand rotary unit 42 relative to the left hand rotary unit 41.

The discharge and the spreading of the crop to the left of the operative direction of movement of the machine is particularly advantageous insofar as no cut and conditioned crop is thrown onto the standing crop and a path which is clear of crop is provided for the right-hand tractor wheels to run along during the next run.

It will be apparent that a machine according to the invention has many advantages over existing machines. The major advantage is that three functions in the process of haymaking are satisfactorily combined in a single machine, these functions being cutting or mowing, conditioning, and evenly spreading the crop in a fluffy manner ready for quick drying. This means that a machine according to the invention is labour saving as at least one further run with an independent tedder can be avoided. Moreover, the mown and conditioned crop is fully exposed to the drying influence of the sun and the wind immediately after being mown and conditioned, so that also the benefit of having conditioned the crop is immediately realised.

Another advantage is that the cutting, conditioning and spreading functions are integrated into a single piece of equipment instead of being a combination of two independent machines towed one behind the other. As a result, the relative relationship between the mower means and the conditioner means does not vary in accordance with ground irregularities and hence the optimum relationship can always be maintained. Moreover, the conditioning and spreading tines cannot touch the ground surface, whereby breakdowns are reduced and mixing of soil, stones, etc. with the crop is eliminated or kept to a minimum.

Finally, it has been experienced that with a mower conditioner according to the invention, the butt ends of the crop stems are more often laid on top of the windrow than has ever been the case in known machines. This is again advantageous for speeding up the drying cycle.

MODIFICATIONS

It will be appreciated that many alternative embodiments of the invention are possible; with reference to the FIGS. 4 to 6 a few of such embodiments will be described. In these figures, the same reference numerals are used for the components similar to those already described.

Figure 4:
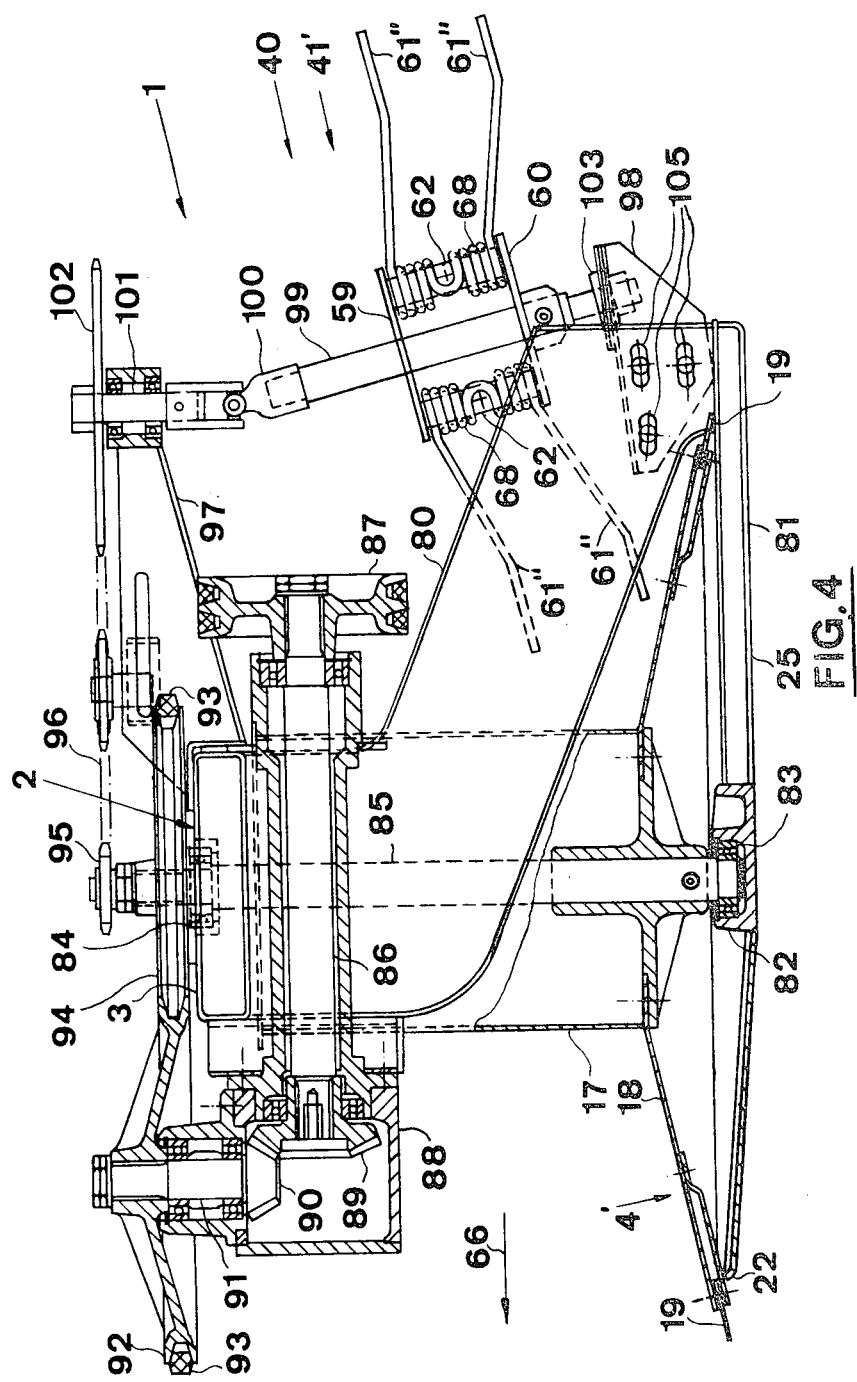

With reference to FIG. 4, this mower-conditioner is again of the tractor-mounted type and comprises a chassis 2 having a transversely extending main and upper beam 3 and rearwardly and downwardly-extending arms 80 secured thereto. The chassis 2 further comprises horizontal and forwardly-extending supports 81 secured to the lower ends of the arms 80. A secondary transverse beam (not shown) extends between the supports 81 at a location slightly forwardly of the rear ends of the supports 81 and interconnects adjacent supports 81. The supports 81 provide bearing seats 82 for bearings 83, and bearings 84 are provided in the upper main beam 3 aligned with the respective bearings 83. Two cutter units 4' are rotatably mounted in the respective upper and lower bearings 84 and 83 and comprise a central shaft 85 extending through the upper main beam 3.

Motive power is transmitted from the tractor PTO in an appropriate manner (not shown) to an intermediate, fore-and-aft extending, shaft 86 which is supported in appropriate bearing means on the main beam 3. This shaft 86 supports an input pulley 87 and is coupled to a gearbox 88 comprising conical gears 89 and 90, the conical gear 89 being mounted on the intermediate shaft 86 and the conical gear 90 being secured on an output shaft 91, which itself supports a pulley 92. A belt transmission 93 is arranged between the pulley 92 and pulleys 94 on the shafts 85 of the cutter units 4' for driving the latter in the appropriate manner. The shafts 85 further also support sprockets 95 for via chain transmissions 96 to drive the conditioning and spreading means 41' and 42' in the directions as described above in connection with the previous embodiment. The conditioning and spreading means according to the present embodiment comprise upper and lower support members 97, 98, respectively, for mounting the same on the upper beam 3 and the rear ends of the arms 80. The conditioning and spreading means further also comprise central shafts 99 which are coupled via universal joints 100 to vertically-extending intermediate shafts 101 which are rotatably mounted on the upper support members 97 and which have at their upper ends sprockets 102 for receiving motive power from the chain transmissions 96. The central shafts 99 are further supported via bearings 103 in the lower support members 98, which in turn are secured to the arms 80. The conditioning and spreading means further comprise tines 61", mounting flanges 59, 60 and mounting sprindles 62 similar to those described in connection with the previous embodiment.

According to the present embodiment, the lower support members 98 may be secured in a range of positions to the arms 80 by fastening means 105. Thus it is possible to adjust the inclination of the rotary units 41', 42'. This enables the operator to adjust the relative relationship of the components of the machine at will and in accordance with the kind of crop to be treated as well as the condition of the crop.

Figure 5:
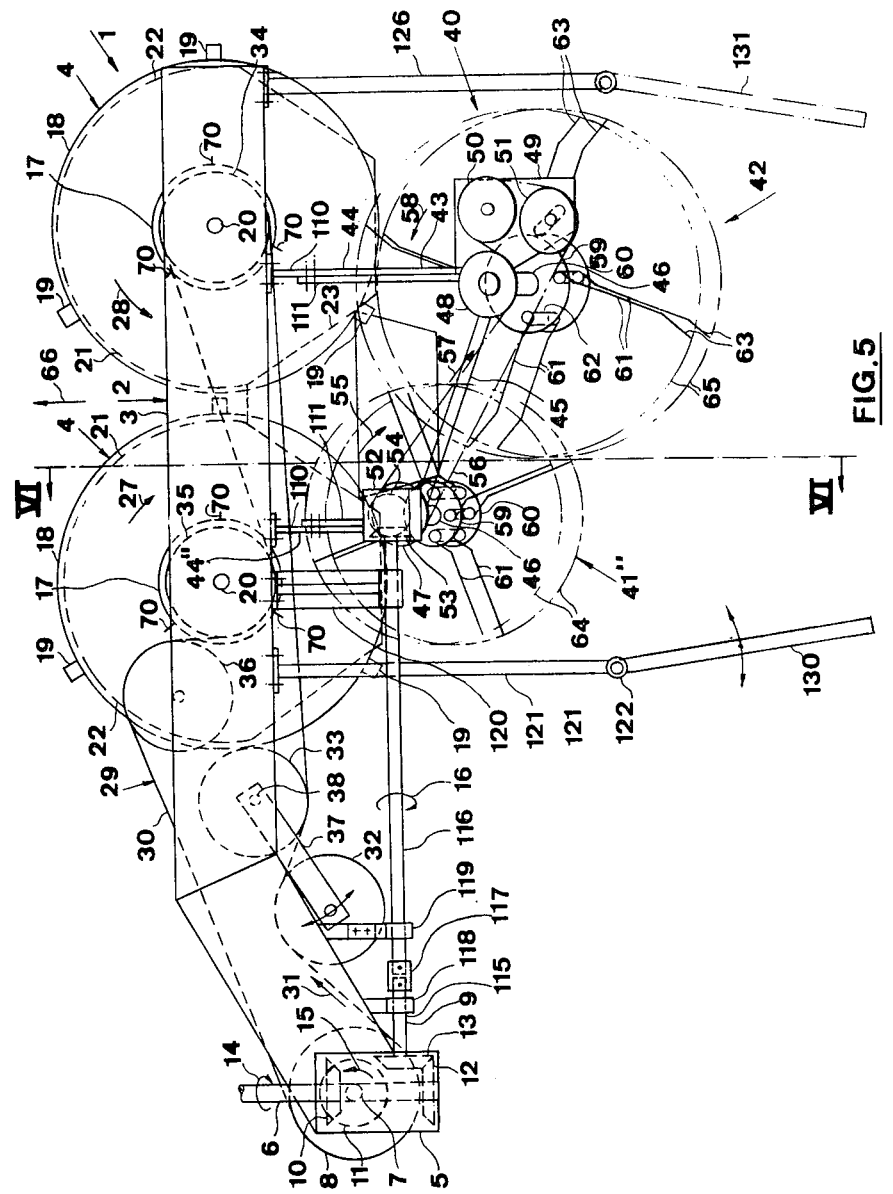

With reference to FIG. 5, it will be seen that, in addition to the rearward offset of the right-hand rotary unit 42 relative to the left-hand rotary unit 41", the right-hand rotary unit 42 of this embodiment has a larger diameter than the other rotary unit 41". This is advantageous for deflecting the conditioned crop in a direction away from the standing crop and, as explained above, it serves to increase the conditioning action of the tines 61-61'.

When the right-hand unit 42 has a larger diameter than the left hand unit 41", it is possible to have the working path of the tines 61 of the unit 42 in close relationship to the rear edge of the associated mower drum 17 and yet to have the centre line between the units 41" and 42 defining an acute angle with the transverse direction for the purposes as explained above. Thereby, the right-hand rotary unit 42 will also continuously and positively clear the rear side of the associated cutter unit 4 of any crop which otherwise might tend to move further around the rear of the cutter unit.

Figure 6:
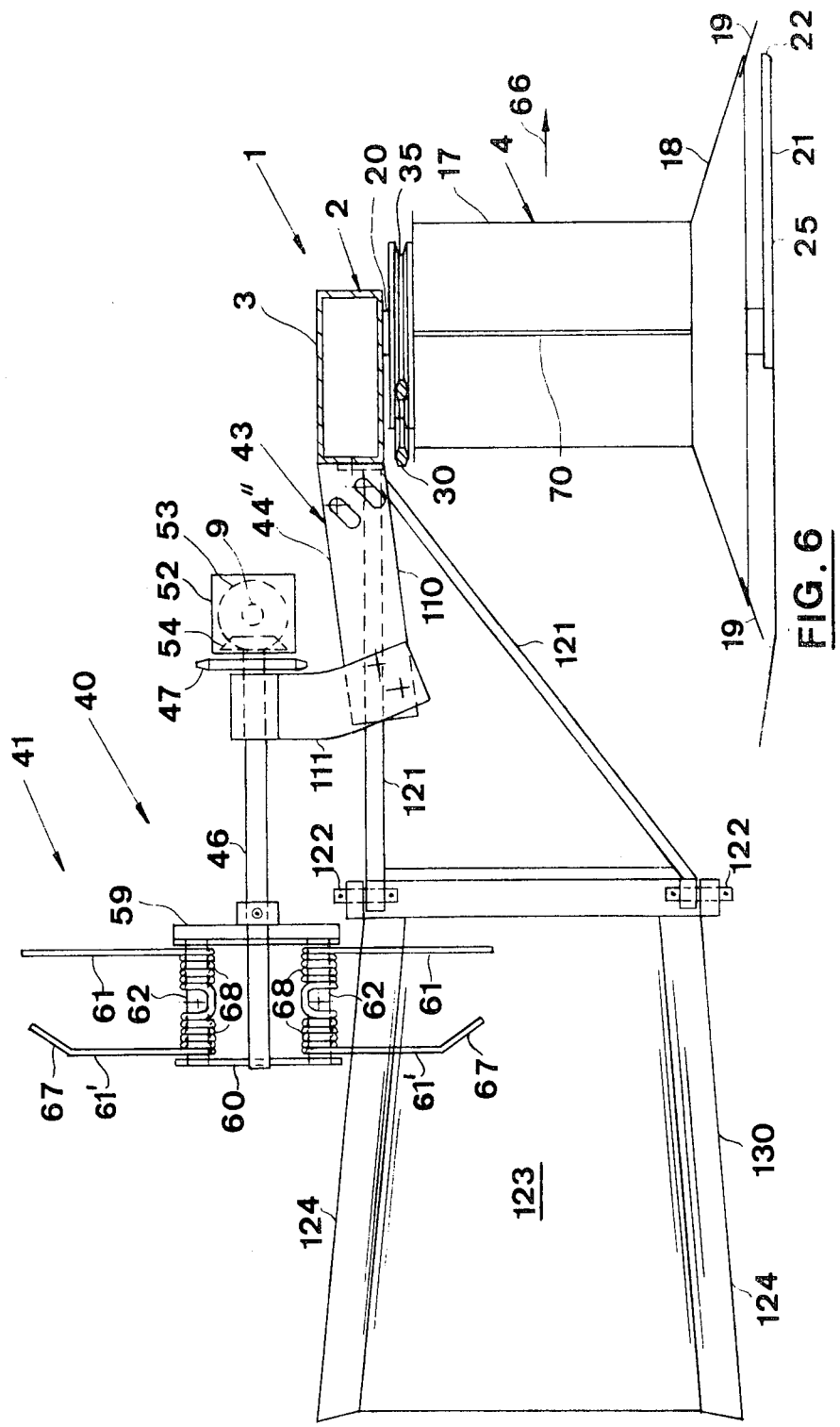

With reference to FIGS. 5 and 6, yet another embodiment of the invention will now be described. In certain exceptional circumstances, the operator may judge it to be desirable only to mow the crop and to deposit it in a narrow windrow on the ground, rather than to condition and to spread the same. Therefore, the conditioner and spreader means may be arranged in such a manner as to be able to be swung towards a non-operative upper position and to have the drive thereto interrupted. To this end, the forwardly projecting mounting beams 44" of the embodiment of FIGS. 5 and 6 comprise two sections 110 and 111 which can be bolted together in general alignment in an operative position (FIG. 5) and generally at right angles in an operative position (FIG. 6). With the arrangement of FIG. 6, the mown crop is conveyed rearwardly by the cutter units 4 and is discharged onto the ground in a relatively narrow windrow of a width dictated by the spacing of the drums 17 as is generally known from drum mowers, without the conditioning and spreading means having any influence thereon. In order to be able to disconnect the drive to the conditioning and spreading means, the transverse shaft 9 comprises two axially-aligned portions 115 and 116 which can be coupled together by a sleeve type coupler 117. The shaft portion 115 is supported in a further bearing member 118, while additional bearing members 119 and 120 support the shaft portion 116.

When starting a harvesting operation, the sidewards delivery of the crop by the conditioning and spreading means (when operative) may cause problems insofar as the crop may be thrown off the field into a neighbouring field or a ditch, for example. In order to avoid this, a deflector 130 is mounted on a support 121 by pins 122 at the left-hand side of the machine. As soon as a few runs (for example three) have been completed and the aforementioned risks no longer exist, the deflector 130 may be removed by taking out the pins 122. The deflector 130 is generally formed by an upright and rearwardly extending central surface 123 with upper and lower inwardly inclined edges 124 (FIG. 6).

In circumstances where side winds tend to cause some of the mown and conditioned crop to be blown on the standing crop, irrespective of the special arrangement of the components, then the deflector plate 130 may be retained in position throughout the harvesting operation. In this connection, a further deflector 131 may be mounted on an additional right-hand support 126, as is shown in broken lines in FIG. 5.

One or more transverse deflectors (not shown) may be mounted behind the rotor units 41, 42 in the stream of cut crop material for deflecting the crop which is discharged from the conditioner and spreader units into a windrow onto the ground. These transverse deflectors may be used independently, or in combination with the generally fore-and-aft extending deflectors 130, 131.

Figure 10:
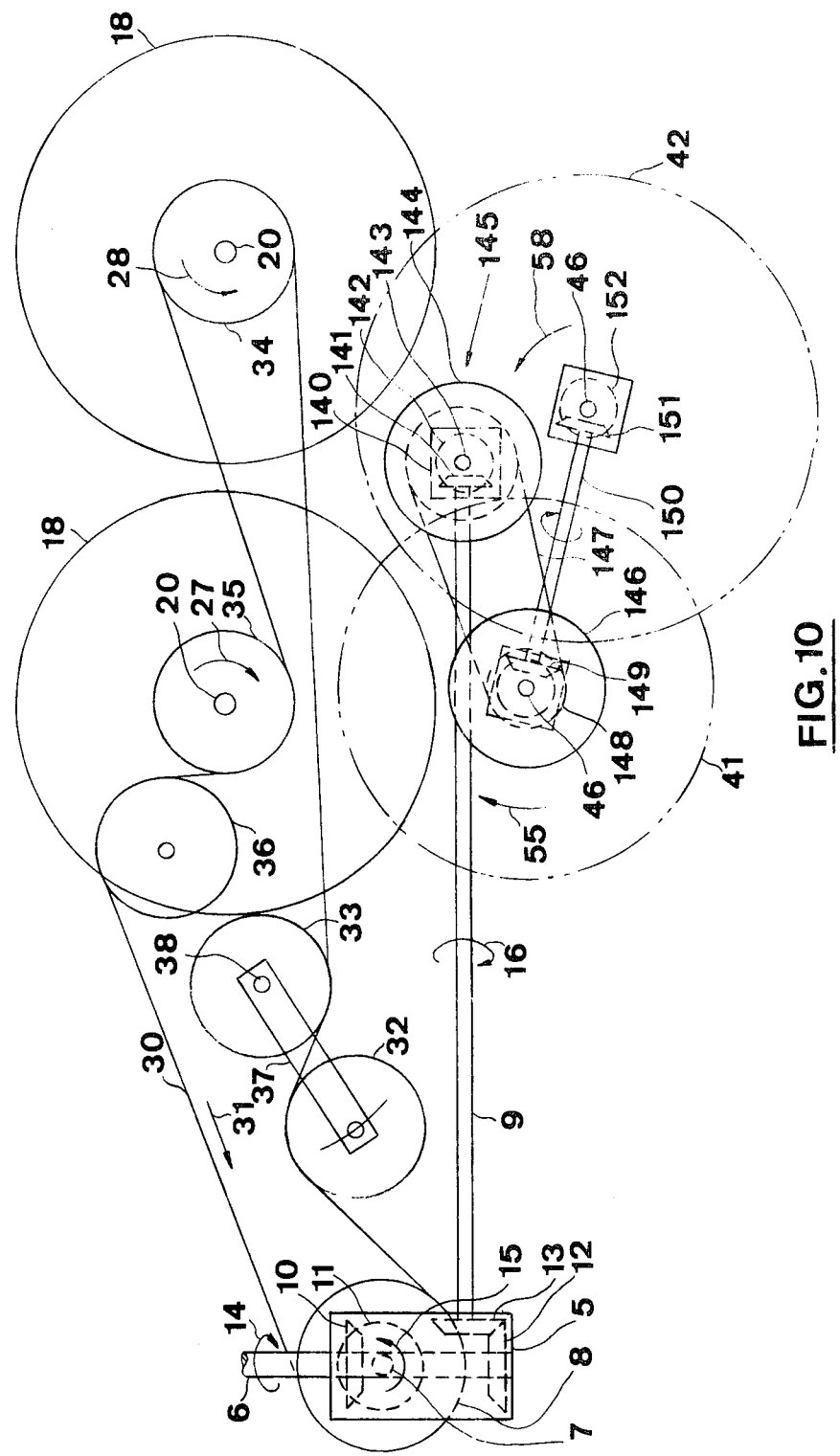

With reference to FIG. 10, there is shown another embodiment with the drive arrangement for the conditioner and spreader means including a gearbox 140 coupled to the shaft 9 with intermeshing conical gears 141, 142. The conical gear 142 is mounted on a vertical output shaft 143 which at its other end supports a first variable pulley 144 of a conventional belt variator, generally indicated at 145. This variator 145 further comprises a second variable pulley 146, mounted coaxially with the left hand conditioner and spreader rotor 41''', and a variator belt 147 mounted therebetween. The left-hand rotor shaft 46 also supports a conical gear 148 which is arranged to mesh with a further conical gear 149 mounted on a transverse shaft 150. This shaft 150 drives the right-hand rotor 42 via a pair of conical gears 151, 152 so that the drive of both rotors 41''', 42 is synchronised.

With this arrangement it is possible to adapt the rotary speed of the rotary units 41''', 42 to the type and condition of crop to be handled the speed being variable from about 280 to 600 r.p.m. Rye grasses, which are rather brittle, may require a circumferential speed of the rotary units 41''', 42 in the range of 15-20 m/sec., as a higher speed might cause unacceptable losses. On the other hand, natural grass may require a circumferential speed in the range of 20-25 m/sec as on the one hand losses are likely to be much smaller and on the other hand, such grasses are more difficult to condition.

With reference to the FIGS. 11 and 12, the belt variator 145 of the embodiment of FIG. 10 is replaced by a gearbox 160 with a pair of input shafts 161 and 162. A drive line 163 comprising a telescopic shaft 164 with a pair of universal joints 165, replaces the shaft 9 of the previous embodiment and is arranged to be mounted between the gearboxes 5 and 160. This drive line 163 is easily coupled to either of the input shafts 161, 162 which support respective gears 166, 167, both of different size and intermeshing with a single gear 168. The single gear 168 is mounted on the shaft 169 which, via pairs of conical gears 170, 171 and 172, 173, respectively, drive the rotor units 41''', 42 in the opposite directions 55, 58. The transmission ratios may be so that, dependent on the drive line 163 being coupled to the shaft 161 or the shaft 162, the rotor units 41''', 42 may be driven at 400 or 600 r.p.m., respectively. A safety clutch 174 is included in the drive line 163.

In other embodiments the drum type rotary cutter means may be replaced by disc type rotary cutter means. Also the present invention can be applied to a pull-type machine as well as tractor-mounted machine of the type described above. It will also be appreciated that rather than making the tines 61 trail relative to the radii of the shafts and mounting spindles 62 of the tines, the tines may extend generally radially. It may be desirable adjustably to mount the tines 61 on the rotor units 41, 42 so that the angular offset relative to said radii may be adjustable.

Finally, it is clear that a machine according to the present invention may be used for haymaking as well as for making hay silage.

We claim:

1. A mower-conditioner comprising:
a chassis adapted to be moved across a field;
transversely-extending rotary mower means mounted to the chassis, the mower means having at least one pair of oppositely-rotated side-by-side extending cutter units for cutting standing crop and for conveying cut crop rearwardly; and
a pair of rotary units mounted to the chassis and rearwardly of each pair of cutter units of the mower means for receiving cut crop from the cutter units, for conditioning said crop and for widely spreading and depositing said crop in a fluffy pattern on the field; and each rotary unit being rotatable about a generally upright axis and with one rotary unit of each pair being located closer to the mower means than the other rotary unit of the pair.

2. A mower-conditioner as described in claim 1, wherein each cutter unit comprises:
a cylindrical body;
a truncated mower flange supported at the lower end of the cylindrical body;
at least one cutter blade mounted at the outer periphery of the truncated mower flange for cutting standing crop by impact, and each pair of cutter units being adapted to convey cut crop rearwardly inbetween the adjacent cylindrical bodies and over the neighbouring ends of the mower flanges of the pair of mower units and at least one rotary unit of the associated pair of rotary crop conditioning and spreading units projecting over the rearward portion of the associated mower flange.

3. A mower-conditioner as described in claim 1, wherein each rotary unit is arranged in use to have the same direction of rotation as the associated cutter unit.

4. A mower-conditioner as described in claim 1, wherein the generally upright rotary axis of each rotary unit of the conditioning and spreading means is inclined forwardly and wherein the conditioning and spreading means comprise a plurality of resilient members for conditioning and spreading crop material and projecting in planes generally perpendicularly to the rotary axis of each rotary unit.

5. A mower-conditioner as described in claim 1, wherein each rotary unit of the conditioning and spreading means comprises:
a central generally upright and forwardly inclined rotary shaft;
mounting members secured generally perpendicularly to said shaft; and
a plurality of outwardly projecting resilient tines mounted on the mounting members and extending parallel therewith; the resilient tines trailing with respect to the direction of rotation of the rotary unit.

6. A mower-conditioner as described in claim 5, wherein each rotary unit of the conditioning and spreading means comprises a plurality of resilient tines, arranged in a plurality of layers extending perpendicularly to the associated shaft.

7. A mower-conditioner as described in claim 6, wherein the tines of the bottom layer of the rotary unit of each pair disposed closer to the mower means, are inclined upwardly at their outer ends.

8. A mower-conditioner as described in claim 5 wherein the tines of the respective rotary units of a pair overlap.

9. A mower-conditioner as described in claim 1, wherein the rotary unit of each pair disposed furthest from the mower means has an effective diameter larger than that of the other rotary unit of the pair.

10. A mower-conditioner as described in claim 1, further comprising a guide means projecting rearwardly and upwardly from below the rearward and adjacent portions of each pair of cutter units to the forward and adjacent portions of the associated rotary units of the conditioning and spreading means for assisting in transferring mown crop from the cutter units to the associated conditioning and spreading units.

11. A mower-conditioner comprising:
a chassis adapted to be moved across a field;
at least one pair of oppositely rotated side-by-side extending drum type cutter units rotatably mounted to the chassis and having truncated mower flanges at their lower ends with at least one cutter blade mounted thereto for cutting standing crop and for conveying cut crop rearwardly;
a generally upright and forwardly inclined shaft rotatably mounted to the chassis rearwardly of each cutter unit; each shaft being arranged in use to have the same direction of rotation as the associated cutter unit and adjacent shafts being spaced differently from the associated cutter units;
a plurality of tines mounted on each shaft and projecting outwardly therefrom for conditioning and spreading crop material received from the cutter units, and the conditioning and spreading tines of at least the shaft mounted closest to its associated cutter unit projecting over the rearward portion of the truncated mower flange thereof for intercepting cut crop conveyed rearwardly thereover; and
drive means for driving the cutter units and said shafts with the conditioning and spreading tines thereon.

12. A mower-conditioner as described in claim 11 wherein the forward inclination of each shaft with the conditioning and spreading tines thereon is adjustable.

13. A mower-conditioner as described in claim 12, further comprising:
supporting members adjustably mounted to the chassis;
bearing means provided in the supporting members for supporting one end of said shafts on the supporting members; and
universal joints coupling the drive means to the other end of said shafts; the supporting members and the universal joints being arranged to enable varying the inclination of said shafts.

14. A mower-conditioner as described in claim 11 further comprising:
means for moving the shafts with the conditioning and spreading means thereon from an operative position to an inoperative position; and
means for interrupting the drive means to the rotary shafts when the latter are moved to the inoperative position.

15. A mower conditioner as described in claim 5 further comprising a generally fore-and-aft extending deflector means affixed to said chassis at one side of the machine and rearwardly of the rotary units in a position for defining one end of the layer of crop material deposited on the ground by the mower-conditioner.

16. A mower-conditioner as described in claim 15 further comprising a further generally fore-and-aft extending deflector means affixed to said chassis on the opposite side of the machine and rearwardly of the rotary units; the two deflector means being adapted to determine the width of the windrow of crop material deposited on the ground by the mower-conditioner.

17. A mower-conditioner as described in claim 11 wherein the drive means comprise a belt variator for enabling adjustment of the speed of rotation of the shafts with the conditioning and spreading tines thereon.

18. A mower-conditioner as described in claim 11 wherein the drive means comprise:
a gearbox with a pair of input shafts and an output shaft drivingly connected to the shafts with the conditioning and spreading tines thereon; the speed of rotation of the output shaft being determined by the use of the one or the other of the pair of input shafts;
a drive line with universal joints and a telescopic shaft selectively connectible to the one or the other of the pair of input shafts.

19. A mower-conditioner as described in claim 11 wherein the paths of the outer ends of the conditioning and spreading tines of pairs of adjacent rotary shafts overlap and wherein the drive means comprise elements drivingly coupling pairs of adjacent shafts with the conditioning and spreading tines thereon for driving the same in synchronism.

* * * * *